United States Patent [19]

Jackson, Jr. et al.

[11] 4,035,356

[45] July 12, 1977

[54] COPOLYESTER PREPARED FROM AN ACYLOXYBENZOIC ACID AND POLYETHYLENE TEREPHTHALATE MODIFIED WITH p-HYDROXYETHOXYBENZOIC ACID

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 684,134

[22] Filed: May 7, 1976

[51] Int. Cl.² .............. C08G 63/06; C08G 63/18; C08G 63/46

[52] U.S. Cl. .............................. 260/47 C; 260/49; 260/860

[58] Field of Search .................... 260/47 C, 49, 860

[56] References Cited

U.S. PATENT DOCUMENTS

| | | | |
|---|---|---|---|
| 3,778,410 | 12/1973 | Kuhfuss et al. | 260/47 C |
| 3,804,805 | 4/1974 | Kuhfuss et al. | 260/47 C |

Primary Examiner—Lester L. Lee
Attorney, Agent, or Firm—Daniel B. Reece, III; Charles R. Martin

[57] ABSTRACT

Disclosed is a copolyester comprised of the following divalent radicals:

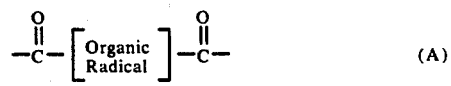

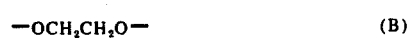

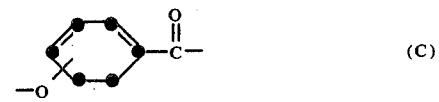

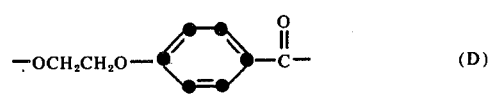

wherein the range of radical (C) is from about 50 to about 80 mole percent, based on the total moles of (A) and (C) combined and the range of radical (D) is from about 20 to about 70 mole percent, based on the total moles of (A) and (D) combined. The copolyesters of this invention are prepared by a process comprised of two steps. The first step comprises forming a fragmented polyester by acidolysis of a starting polyester with an acyloxybenzoic acid. The second step comprises increasing the inherent viscosity of the fragmented polyester to form the copolyester of the invention. Radical (A) of the copolyester is contributed from the dicarboxylic acid portion of the starting polyester. Radical (B) of the copolyester is contributed from the ethylene glycol portion of the starting polyester. Radical (C) of the copolyester is contributed from the acyloxybenzoic acid, and will be recognized as the radical remaining after removal of the acyl and hydroxy groups from the acyloxybenzoic acid. Radical (D) of the copolyester is contributed from a combination of the ethylene glycol and the ester of p-hydroxybenzoic acid used in preparing the starting polyester. The copolyesters of this invention exhibit unobvious mechanical properties.

5 Claims, 3 Drawing Figures

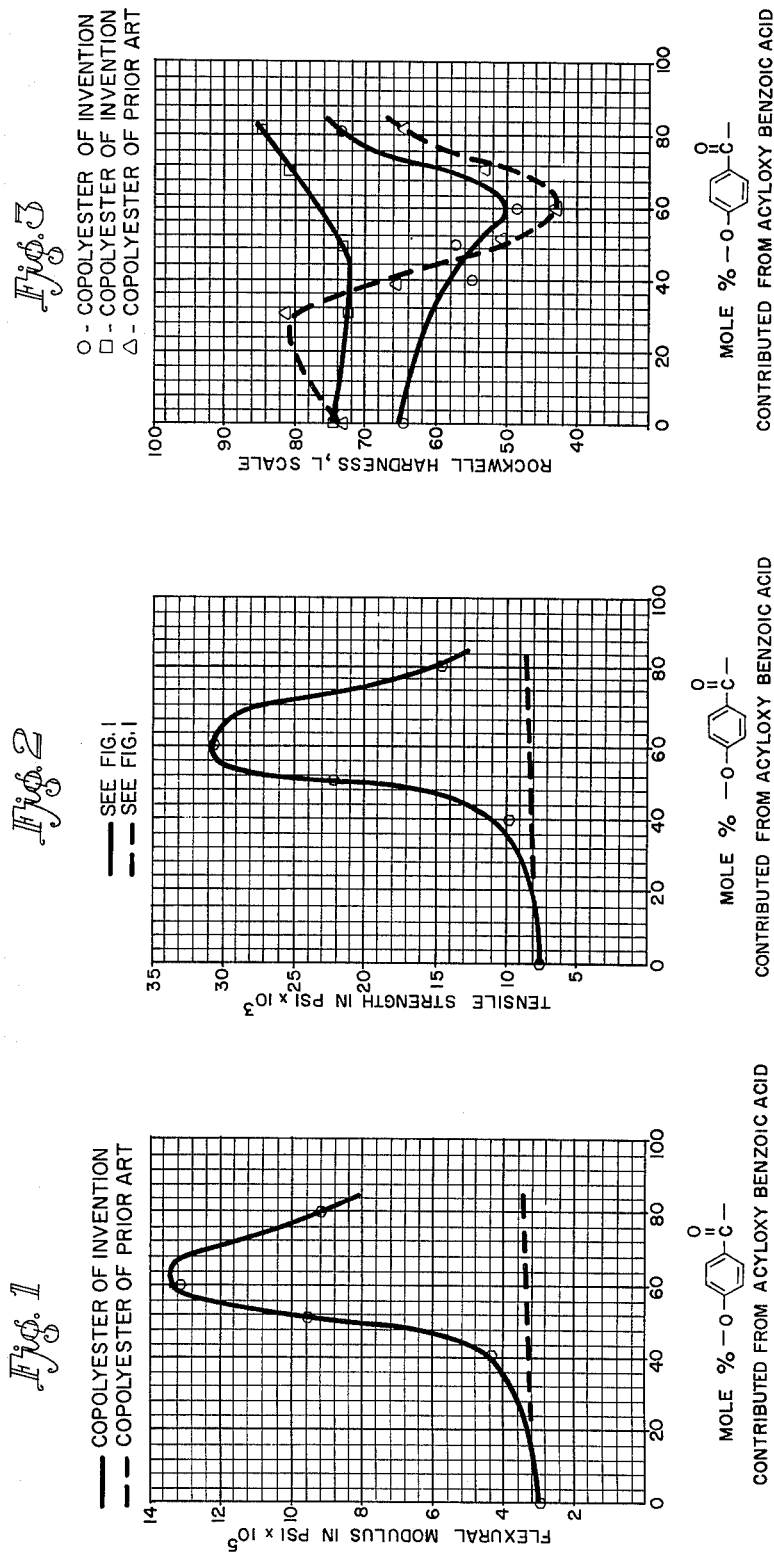

COPOLYESTER PREPARED FROM AN ACYLOXYBENZOIC ACID AND POLYETHYLENE TEREPHTHALATE MODIFIED WITH p-HYDROXYETHOXYBENZOIC ACID

This invention relates to a copolyester which exhibits unobvious mechanical properties.

The use of objects molded from synthetic polymers has expanded rapidly in the last several decades. In particular, certain synthetic polymers, including polyesters, have gained acceptance for molding objects that will be subjected to high strength service. These synthetic polymers have mechanical properties sufficiently high that in some cases objects molded of these polymers can be substituted for objects formed from much stronger materials, such as ceramic and metallic materials.

One of the most desirable polymers for molding articles for high strength service are copolyesters prepared from poly(ethylene terephthalate) and an acyloxybenzoic acid. Polyesters of this type are disclosed in U.S. Pat. Nos. 3,804,805 and 3,778,410. Although these copolyesters have a desirable balance of high mechanical properties there is a need to increase the hardness of this type of copolyester. The need for hardness is sufficiently important that it would be acceptable to reduce the mechanical properties of these types of copolyesters to a limited extend if the hardness could be increased. Thus, there is a need for a copolyester having a better overall balance of properties by having almost as high mechanical properties as copolyesters prepared from poly(ethylene terephthalate) and an acyloxybenzoic acid but having a hardness greater than copolyesters prepared from poly(ethylene terephthalate) and an acyloxybenzoic acid.

Applicants have now invented a copolyester which has a better overall balance of properties by having general mechanical properties that art almost as high as the poly(ethylene terephthalate), acyloxybenzoic acid type of copolyester but have an increased hardness compared to this type of copolyester.

Very broadly, the copolyester of this invention is comprised of the following divalent radicals:

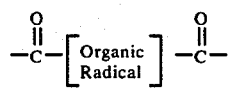   (A)

   (B)

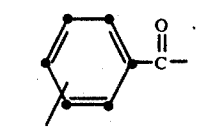   (C)

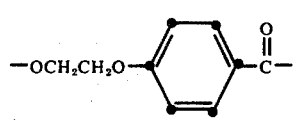   (D)

The copolyester of this invention contains from about 50 to about 80 mole percent of the divalent radical (C) which is

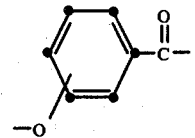

and about 20 to about 70 mole percent divalent radical (D) which is

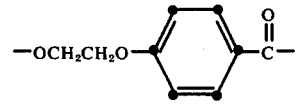

In this invention, the divalent radical (C) is contributed from the p-acyloxybenzoic acid, a divalent radical (D) is contributed from the reaction of ethylene glycol and p-hydroxybenzoic acid or its alkyl ester. As will be recognized by those skilled in the art, the divalent radical (C) is a portion of the divalent radical (D). Although divalent radical (C) is a portion of divalent radical (D), no portion of the 50 to 80 mole percent of radical (C) in the copolyester of the invention is included in the amount of radical (D) in the copolyester. Thus, since radical (C) is contributed from the acyloxybenzoic acid, the 50 to 80 mole percent of radical (c) comes from the acyloxybenzoic acid and does not include any contribution from the p-hydroxybenzoic acid, which is used to form radical (D).

Applicants are aware of two different types of prior art that are related to the copolyester of the invention.

The first type of prior art can be regarded as the "ester interchange" type of prior art. In the ester interchange type of prior art, polyesters are prepared by conducting an ester interchange reaction based on a dialkyl ester of terephthalic acid, ethylene glycol, and an alkyl ester of p-hydroxybenzoic acid. Examples of this kind of prior art are disclosed in column 2, lines 24-28 of U.S. Pat. No. 3,804,805.

The second type of prior art can be regarded as the "fragmented copolyester" type of prior art. The fragmented copolyester type of prior art applicants are aware of is U.S. Pat. Nos. 3,804,805, 3,778,410, 3,890,256 and 3,772,405.

The copolyester of this invention is literally distinguishable over the copolyesters of the ester interchange type of prior art because the structure of the molecular chain of the copolyester of this invention is different than the structure of the molecular chain of the copolyesters of the ester interchange type of prior art. Specifically, the polyester of the ester interchange type of prior art is composed of radicals such as radical (A), radical (B), and radical (D), while the copolyester of this invention contains radicals (A), (B), (C) and (D).

The copolyester of this invention is thought to be unobvious over the ester interchange type of prior art because the copolyesters of this invention exhibit mechanical properties that are unobvious over the mechanical properties that one would expect of these copolyesters based on the ester interchange type of prior art.

FIGS. 1 and 2 represents graphs of important mechanical properties of both the copolyesters of the ester interchange type of prior art and the copolyesters of the invention.

FIG. 1 represents the flexural modulus, or stiffness, of the copolyester of the invention and the flexural modulus of the copolyester of the ester interchange type of prior art. In FIG. 1 the amount of radical (C), which is contributed from the acyloxybenzoic acid, is plotted on the horizontal scale and varied over a range of 0 to 80 mole percent, based on the total moles of radical (C) and the dicarboxylic acid used to prepare the copolyester. The flexural modulus in psi $\times 10^5$ is plotted on the vertical scale.

FIG. 2 is similar to FIG. 1 but represents the tensile strength of the copolyester of the invention and the tensile strength of the copolyester of the ester interchange type of prior art.

The copolyesters of the ester interchange type of prior art of FIGS. 1 and 2 are prepared according to the ester interchange method disclosed in Example 1 of U.S. Pat. No. 3,288,755 using dimethyl terephthalate, ethylene glycol and an amount of methyl p-hydroxybenzoate varying from 0 to 80 mole percent. Inherent viscosities of the copolyesters of the invention reported in FIGS. 1 and 2 are around 0.60 to 0.85. The copolyesters of the invention of FIGS. 1 and 2 were prepared in accordance with the method described in detail herein by preparation of a starting polyester and then contacting the starting polyester with p-acetoxybenzoic acid to form the fragmented copolyester.

Referring now to FIG. 1, it is to be observed that the flexural modulus of the copolyesters of the prior art are about 3.0 to 3.5 33 $10^5$ p.s.i., which is about the flexural modulus typical for polyesters of this general type. In contrast, it is to be observed that within the range of about 50 to about 80 mole percent of the

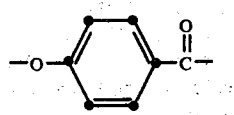

radical contributed from p-acetoxybenzoic acid the flexural modulus of the copolyester of the invention is unobviously high when compared to the flexural modulus of the copolyesters of the ester interchange type of prior art. Specifically, the flexural modulus in this range is at least a value in the order of about $9 \times 10^5$ p.s.i., and is higher in all other parts of this range, while the flexural modulus of the copolyesters of the ester interchange type of prior art is less than $4 \times 10^5$ p.s.i. Also, it is to be observed that within the range of 50 to 70 mole percent the flexural modulus is even higher. The maximum flexural modulus occurs at about 60 mole percent where the flexural modulus is a value in the order of about 13 33 $10^5$ p.s.i.

Referring now to FIG. 2, it is to be observed that the tensile strength of the copolyesters of the ester interchange type of prior art is about 7500 to 8500 p.s.i., which is about the tensile strength typical for polyesters of this general type. By way of contrast, it is to be that within the range of about 50 percent to about 80 mole percent of the

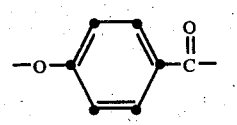

radical contributed from p-acetoxybenzoic acid the tensile strength of the copolyesters of the invention is unobviously high when compared to the tensile strength of the copolyesters of the ester interchange type of prior art. Within this range the tensile strength of the copolyester of the invention is at least a value in the order of about 15,000 p.s.i., while the tensile strength of the copolyesters of the ester interchange type of prior art is not more than a value in the order of about 9000 p.s.i. Within the range of about 50 to about 70 mole percent the tensile strength is even higher. The maximum tensile strength occurs at about 60 mole percent and is a value in the order of about 30,000 p.s.i.

The copolyester of this invention is thought to be literally distinquishable from the fragmented copolyester type of prior art, such as disclosed in U.S. Pat. Nos. 3,804,805 and 3,778,410 because the copolyesters of the fragmented copolyester type of prior art have less than 3 mole percent aliphatic to aromatic linkages and the copolyesters of this invention have in excess of 3 mole percent aliphatic to aromatic oxygen linkages.

The copolyesters of this invention are thought to be unobvious over the fragmented copolyester type of prior art because the hardnes of the copolyesters of this invention is unobvious in view of the hardness one would expect of these copolyesters in view of the hardness of the copolyesters of the fragmented copolyester type of prior art.

The manner in which the hardness of the copolyester of this invention is distinquishable from the hardness of the fragmented copolyester type of prior art can be fully appreciated by considering FIG. 3.

FIG. 3 represents the hardness of typical copolyesters of the invention and the hardness of typical copolyesters of the fragmented copolyester type of prior art. More specifically, in FIG. 3 there is plotted on the vertical scale the hardness of the copolyester, measured in Rockwell hardness, L scale, according to ASTM D785 Method A. There is plotted on the horizontal scale the mole percent of the radical

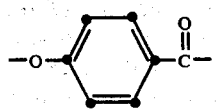

contributed from the acyloxybenzoic acid, based on the total moles of terephthalic acid and acyloxybenzoic acid.

Three curves have been presented in FIG. 3. One curve, associated with the data points represented by triangles, is for typical copolyesters of the fragmented copolyester type of prior art. The data for this curve are obtained by preparing a number of copolyesters of poly(ethylene terephthalate) and varying amounts of p-acetoxybenzoic acid in accordance with the process disclosed in U.S. Pat. No. 3,804,805 or U.S. Pat. No. 3,778,410. The copolyesters are molded into $5 \times \frac{1}{2} \times 150$ inch flexure bars at temperatures ranging from 250° to 340° C., L-scale, on the copolyester melting point, and the Rockwell hardness, is determined by ASTM D785 Method A.

Two other curves have been presented in FIG. 3. One curve, associated with the circular data points, is for one typical group of copolyesters of the invention. These copolyesters are composed of divalent radicals contributed from terephthalic acid, ethylene glycol, radical (D) from the condensation product of ethylene glycol and methyl p-hydroxybenzoate, and varying quantities of radical (C), contributed from p-acetoxybenzoic acid. The data for this curve was obtained by first preparing a copolyester prepolymer containing 20 mole percent of radical (D), based on the total moles of (A) and (D) combined, and then contacting the prepolymer with p-acetoxybenzoic acid in a manner similar to that disclosed in U.S. Pat. Nos. 3,804,805 and 3,778,410. For example, the data point for the copolyester of the invention composed of radical (A) from terephthalic acid, radical (B) from ethylene glycol, radical (D) from the condensation product of ethylene glycol and methyl p-hydroxybenzoate, and 60 mole percent of radical (C), contributed from p-acetoxybenzoic acid, was prepared and the hardness obtained in the following manner.

A starting polyester is prepared by ester interchanging the proper amounts of dimethyl terephthalate, ethylene glycol and methyl p-hydroxybenzoate in accordance with the method disclosed in Example 1 of U.S. Pat. No. 3,288,755. This starting copolyester contains 20 mole percent radical (D) based on the total moles of radical (A) and radical (D). A mixture of 74.4 g. (0.4 mole) of the starting copolyester (I.V. 0.56) and 108 g. (0.6 mole) of p-acetoxybenzoic acid is placed in a 500-ml. flask equipped with a stirrer, a short distillation column and an inlet for nitrogen. The flask is evacuated and purged three times with nitrogen before being lowered into a metal bath maintained at 275° C. As the mixture is stirred at 275° C. in a nitrogen atmosphere, acetic acid slowly distills from the flask. After 60 minutes, most of the acid has evolved and a low-melt-viscosity melt is obtained. A vacuum of 0.5 mm is then applied at 275° C., and stirring is continued for 4 hours. A yellow, opaque, high melt viscosity polymer is obtained. The polymer has an inherent viscosity of 0.85. The polymer is molded into 5 × 178 × ⅛ inch flexural bars at 300° C. and the Rockwell hardness determined as described above.

The other curve, assiocated with the square data points, is for another typical polyester of the invention. These copolyesters are prepared by reaction of a starting polyester composed of radical (A) from terephthalic acid, radical (B) from ethylene glycol, and 50 mole percent radical (D) contributed from the condensation of ethylene glycol and methyl p-hydroxybenzoate, with varying quantities of p-acetoxybenzoic acid. The data for this curve was obtained in a similar manner as described above for the other copolyester of the invention.

As can be readily observed from a consideration of the curves in FIG. 3, the hardness of the two typical groups of copolyesters of the invention, containing 50 to 80 mole percent radical (C), are higher than the hardness of the copolyester of the fragmented copolyester type of prior art. Specifically, within the range of 50 to 80 mole percent of radical (C), the hardness of the copolyester of the invention, prepared from the starting polyester containing 20 mole percent of radical (D), is in the order of about 8 hardness units higher than the copolyester of the fragmented copolyester type of prior art. In addition, the hardness of the other typical copolyester of the invention, prepared from the starting polyester containing 50 mole percent radical (D), is generally in the order of about 20 to 30 hardness units greater than the copolyester of the fragmented copolyester type of prior art.

The unobviousness of the greater hardness of the copolyesters of the invention can be fully appreciated by considering that the copolyesters of the invention have substantial amounts of aliphatic to aromatic oxygen linkages, contained in radical (D), while the copolyester of the fragmented copolyester type of prior art contain less than 3 mole percent aliphatic to aromatic oxygen linkages. As is well known in the art, modification of a polyester by introducing aliphatic to aliphatic oxygen linkages produces a softer polyester. Large amounts of aliphatic to aliphatic oxygen linkages even produces an elastomeric polyester. Typical of these disclosures are Journal of Polymer Science, 3, p. 609, (1948); U.S. Pat. Nos. 3,023,192, 3,651,014, and 3,763,109. Since radical (D) contains an aliphatic to aromatic oxygen linkage, it would be thought that the aliphatic oxygen linkage portion of the radical would cause at least some softening of the copolyester, even though it might not be as large as if the linkage was an aliphatic to aliphatic oxygen linkage. Stated another way, since the aliphatic to aromatic oxygen linkage of radical (D) is half aliphatic in character, one would assume the same general phenomenon would occur as does occur when the linkage is an aliphatic to aliphatic oxygen linkage. Quite surprisingly, we have discovered that the hardness values of the copolyesters of the invention, containing substantial quantities of an aliphatic to aromatic oxygen linkage in radical (D), are not lower than the hardness values of the copolyesters of the fragmented copolyester type of prior art, but, quite surprisingly, the hardness values of the copolyesters of the invention, containing substantial quantities of an aliphatic to aromatic oxygen linkage in radical (D) are actually higher than the copolyesters of the fragmented copolyester type of prior art. Accordingly, it can be regarded as unobvious that the hardness of the copolyesters of the invention, containing substantial quantities of a linkage that would be expected to make a polyester softer, actually make the copolyester harder.

Broadly, the copolyester of this invention can be described as having an inherent viscosity of at least 0.4 comprised of the following divalent radicals:

  (A)

  (B)

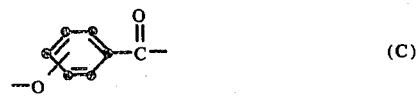  (C)

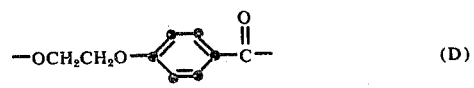  (D)

wherein
$R_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of $R_1$ is the divalent aromatic radical, the range of radical (C) is from about 50 to about 80 mole percent, based on the total moles of (A) and (C) combined, in radical (C) the oxygen in linked either in the meta or para position with regard to the carbonyl group, at least 60 mole percent of radical (C) is the para isomer, and the range of radical (D) is from about 20 to about 70 mole percent, based on the total moles of (A) and (D) combined.

In the most preferred embodiment, the copolyester of this invention can be described as having an inherent viscosity of at least 0.4 comprised of the following divalent radicals:

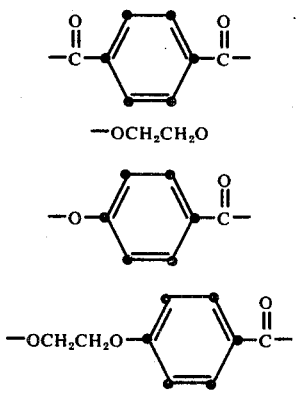

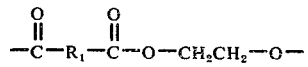

wherein the amount of radical (C) is in the range of 50 to 70 mole percent, based on the total moles of radical (A) and radical (C) combined, and the amount of radical (D) is in the range of 20 to 50 mole percent, based on the total moles of radical (A) and (B) combined.

Very broadly, the copolyesters of this invention are prepared by a process comprised of two steps. This process is well known in the art and is disclosed in U.S. Pat. Nos. 3,804,805 and 3,778,410.

The first step of the process comprises preparing a fragmented polyester by contacting an acyloxy benzoic acid with a starting polyester having an inherent viscosity of at least about 0.2. The second step of the process comprises preparing the copolyester by increasing the inherent viscosity of the fragmented polyester to at least 0.4. The starting polyester is formed from a dicarboxylic acid or its dialkyl ester, ethylene glycol, and an alkyl ester of p-hydroxybenzoic acid and is a random arrangement of two types of repeating units. One type of unit is composed of radical (A), which is the divalent radical remaining after the removal of the hydroxyl groups from the dicarboxylic acid, attached to radical (B), which is the divalent radical remaining after removal of the hydrogen atoms from ethylene glycol. The other type of unit is composed of radical (D), which is the divalent radical remaining after removal of the alkoxy group and the terminal hydrogen atom from the p-(2-hydroxyethoxy)benzoic acid ester which is formed from the ethylene glycol and the alkyl ester of p-hydroxybenzoic acid. Upon contact, the starting polyester and acyloxybenzoic acid react by acidolysis to form the fragmented copolyester. The inherent viscosity of the fragmented copolyester is increased to form the copolyester of this invention comprised of four kinds of divalent radicals. The first divalent radical, designated radical (A), comes from the dicarboxylic portion of the starting polyester and is the divalent radical remaining after the removal of the hydroxyl groups from the dicarboxylic acid. The second divalent radical, designated radical (B), comes from the ethylene glycol portion of the polyester and is the divalent radical remaining after removal of the hydrogen atoms from the ethylene glycol. The third divalent radical, designated radical (C), comes from the acyloxybenzoic acid and is the divalent radical remaining after removal of the acyl and hydroxy groups from the acyloxy benzoic acid. The fourth divalent radical, designated radical (D), comes from the combination of ethylene glycol and the p-hydroxybenzoic acid ester and is the divalent radical remaining after removal of the alkoxy group and the terminal hydrogen from the p-(2-hydroxyethoxy)benzoic acid ester condensation product of ethylene glycol and alkyl ester of p-hydroxybenzoic acid.

The starting polyester is comprised of repeating units corresponding to the formula $$-\overset{O}{\underset{\|}{C}}-R_1-\overset{O}{\underset{\|}{C}}-O-CH_2CH_2-O-$$

wherein $R_1$ is the same as described earlier and will be recognized as the divalent radical remaining after removal of the carboxyl groups from the dicarboxylic acid used to prepare the starting polyester. In a preferred embodiment of the invention $R_1$ can be a divalent aromatic radical having 6 to 16 carbon atoms. More preferably, $R_1$ can be a divalent aromatic radical having 6 carbon atoms. Examples of dicarboxylic acids that can be used to prepare the starting polyester include malonic; dimethylmalonic; succinic, glutaric; adipic; 2-methyladipic; trimethyladipic; pimelic; 2,2-dimethylglutaric; 3,3-diethylsuccinic; azelaic; sebacic; suberic; 1,3-cyclopentanedicarboxylic; 1,3-cyclohexanedicarboxylic; 1,4-cyclohexanedicarboxylic; terephthalic; isophthalic; 4-methylisophthalic; t-butylisophthalic; 2,5-norbornanedicarboxylic; 1,4-naphthalic; diphenic; 4,4'-methylenedibenzoic; diglycolic; 2,5-naphthalenedicarboxylic; 2,6-naphthalenedicarboxylic; 2,7-naphthalenedicarboxylic; dibenzoic acid; bis-(p-carboxyphenyl)methane; methane; ethylene-bis-p-benzoic acid; and 1,5-naphthalene dicarboxylic acids. If desired a halogenated aromatic dicarboxylic acid may be used such as dichloroterephthalic acid or dibromoterephthalic acid. Preferably not over 25 mole percent halogenated aromatic dicarboxylic acid is used. The ester-forming derivatives which may be used include the esters, such as methyl, ethyl, phenyl, and monomeric ethylene glycol esters. Examples of these esters include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Other derivatives may also be used to prepare these polyesters.

Ethylene glycol is the idol used to form the starting polyester of this invention.

The starting polyesters of this invention can be prepared by conventional processes well known in the art, such as direct esterification or ester interchange, followed by polycondensation.

The acyloxybenzoic acid that reacts with the starting polyester, and provides the radical (C) in the final fragmented copolyester, corresponds to the structure

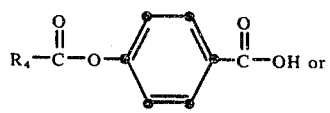

-continued

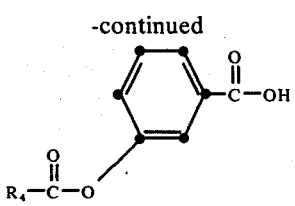

wherein $R_4$ is a monovalent alkyl radical of 1 to 8 carbon atoms or a monovalent aromatic radical of 6 carbon atoms and at least 60 mole percent of the acyloxybenzoic acid is the para isomer.

In another embodiment, $R_4$ is a monovalent alkyl radical having 1 to 8 carbon atoms and in another embodiment $R_4$ is a monovalent alkyl radical having 1 to 4 carbon atoms. In still another embodiment at least 90 mole percent of the acyloxy benzoic acid can be the para isomer. Preferably, $R_4$ is a monovalent alkyl radical having one carbon is which case the acyloxybenzoic acid is p-acetoxybenzoic acid.

Examples of acyloxy benzoic acids include meta and para acetoxybenzoic acid; meta and para propionyloxy benzoic acid; metal and para butyryloxy benzoic acid; and meta and para benzoyloxybenzoic acid.

The acyloxybenzoic acids can be prepared by conventional processes, such as reaction between p-hydroxybenzoic acid and a carboxylic anhydride, such as acetic anhydride. Other processes for preparation of the acyloxyaromatic carboxylic acids are well known in the art.

Although this invention has been broadly described as containing 50 to 80 mole percent divalent radical (C) it is within the scope of this invention to replace a portion of divalent radical (C) with a divalent radical contributed from an aromatic diol having chain extending oxygen linkages coaxial or parallel and oppositely directed. These type of aromatic diols are well known in the art and are described in U.S. Pat. No. 3,890,256. Several preferred aromatic diols are hydroquinone, 2methylhydroquinone and 2-chlorohyroquinone. As described in U.S. Pat. No. 3,890,256, when an aromatic diol is to be used, its diacyl ester is used along with an equivalent amount of dicarboxylic acid contributed from divalent radical (A). The amount of aromatic diol that can be used is an amount that preserves the unobvious mechanical properties of the copolyester of this invention. For example, when the aromatic diol is hydroquinone, up to 30 mole percent of divalent radical (C) can be replaced by the divalent radical contributed from hydroquinone. In other cases, smaller amount of aromatic diol can be used because the use of a larger amount of aromatic diol will foil to preserve the unobvious mechanical properties of the copolyester.

The thermodynamic conditions that can be used in the first step of preparing the fragmented polyester by contacting the starting polyester with the acyloxybenzoic acid can very widely depending on the desires of the practitioner of the invention. Although other temperatures can be used, the starting polyester and the acyloxybenzoic acid can be contacted within a temperature range of about 240° to about 320° C. In another embodiment the starting polyester and the acyloxybenzoic acid can be contacted within the temperature range of 250° to 280° C. Temperatures higher than about 320° C. can be undesirable since temperatures this high may cause degradation of the copolyester. Temperatures below about 240° C. can be undesirable since the reaction rate between the acyloxybenzoic acid and the starting polyester will be lowered. A wide variety of pressures can be used to prepare the copolyester prepolymers. Atmospheric pressure is typically used during the first step of the process. A wide variety of times can be used to prepare the copolyester prepolymer. Of course, the starting polyester and the acyloxybenzoic acid may be in contact for a long enough period of time to react to form the copolyester prepolymer.

The acyloxy aromatic carboxylic acid can be contacted with the starting polyester using a wide variety of methods well known in the art. In most instances the starting polyester and acyloxybenzoic acid are solids at standard temperature and pressure. In this instance in two solids can be mixed and heated until molten. In other instances the starting polyester and acyloxybenzoic acid can be in liquid form, in which case the two liquids can be contacted by admixng the liquids.

As noted above, the second step of the process involves increasing the inherent viscosity of the fragmented polyester to at least 0.4 to form the copolyester of the invention which is suitable for forming into useful articles. The increase in inherent viscosity of the fragmented polyester can be accomplished by any one of several conventional methods well known in the art to build up the molecular weight of linear polyesters. When the fragmented polyester is a hot, molten material, the fragmented polyester can be conventionally built up by a technique similar to the polycondensation step in the production of poly(ethylene terephthalates). In this technique a sub-atmospheric pressure is created above the fragmented polyester and the fragmented polyester is heated while polycondensation products are removed overhead. The fragmented polyester can be stirred if desired.

When the fragmented polyester takes the form of a solid, molecular weight build up can be conveniently accomplished by fluidization techniques well known in the art such as are used to build up the molecular weight of poly(ethylene terephthalate).

The thermodynamic conditions that can be used to prepare the copolyester by increasing the inherent viscosity of the fragmented polyester can also vary widely depending on the desires of the practitioner of the invention. Although other temperatures can be used, in one embodiment a temperature in the range of about 200° to about 320° C. can be used, and in another embodiment a temperature in the range of 200° to 280° C. can be used. As in the case of the preparation of some fragmented polyesters, temperatures above 320° C. can be used but tend to cause degradation of the fragmented polymer. Temperatures below 200° C. produce less desirable rates of increase in the inherent viscosity of the fragmented polyester. Although other pressures can be used, a pressure in the range of about 800 mm. to 0.05 mm. Hg can be used. It is particularly convenient to conduct the first step of the invention at approximately atmospheric pressure and then start the second step of the invention at the same pressure and gradually reduce the pressure as the inherent viscosity of the fragmented polyester builds up. The time that can be used is not critical but, of course, sufficient time must be allowed to build up the fragmented polyester to the inherent viscosity desired for the copolyester of this invention.

The inherent viscosity of the copolyester of this invention is at least 0.4 but can vary widely upward from 0.4. In one embodiment the inherent viscosity of the copolyester is at least 0.5. The inherent viscosity of the copolyester can, if desired, be increased still further to an inherent viscosity of 0.6, 0.7, 1.0, or even higher, using techniques well known in the art for increasing the molecular weight of linear polyesters.

The inherent viscosity of the polyesters of this invention is measured at 25° C. using 0.50 gram of polymer per 100 ml. of a solvent composed of 60 volumes of phenol and 40 volumes of tetrachloroethane.

Although the first and second steps of this invention can be conducted without use of a catalyst other than the catalyst in the polyester itself, a catalyst such as cobalt may be used in the second step to facilitate inherent viscosity build-up of the fragmented polyester.

The copolyesters of this invention are useful for preparing films, fibers, and other shaped objects. The copolyesters of this invention can be molded into useful articles using conventional methods well known in the art, such as injection molding.

The copolyesters of this invention also may contain nucleating agents, fillers, pigments, glass fibers, asbestos fibers, antioxidants, stabilizers, plasticizers, lubricants, fire-retardants, and other additives.

The invention has been described in detail with particular reference to certain preferred embodiments thereof, but it will be understood that variations and modifications can be effected within the spirit and scope of the invention.

We claim:

1. A copolyester having an inherent viscosity of at least 0.4 consisting essentially of the following divalent radicals:

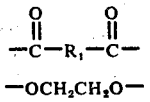 (A)

—OCH$_2$CH$_2$O— (B)

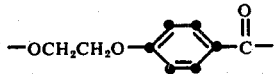 (C)

 (D)

wherein
R$_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of R$_1$ is the divalent aromatic radical,
the range of radical (C) is from about 50 to about 80 mole percent, based on the total moles of (A) and (C) combined,
in radical (C) the oxygen is linked either in the meta or para position with regard to the carbonyl group,
at least 60 mole percent of radical (C) is the para isomer, and
the range of radical (D) is from about 20 to about 70 mole percent, based on the total moles of (A) and (B) combined.

2. The copolyester of claim 1 wherein
R$_1$ is a divalent radical having 6 to 16 carbon atoms, at least 90 mole percent of radical (C) is the para isomer, the range of radical (C) is from 50 to 70 mole percent, and the range of radical (D) is from 20 to 50 mole percent.

3. The copolyester of claim 2 wherein R$_1$ is a divalent aromatic radical having 6 carbon atoms.

4. The copolyester of claim 3 wherein radical (A) is

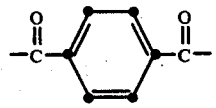

5. A copolyester having an inherent viscosity of at least 0.4 consisting essentially of the following divalent radicals:

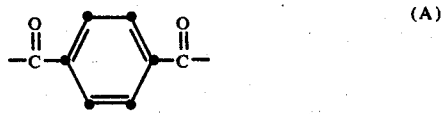 (A)

—OCH$_2$CH$_2$O— (B)

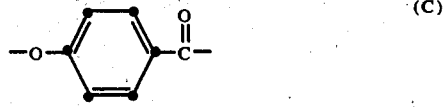 (C)

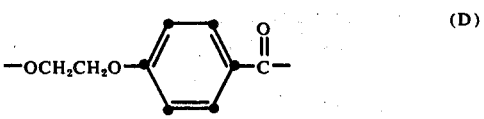 (D)

wherein the amount of radical (C) is in the range of 50 to 70 mole percent, based on the total moles of radical (A) and radical (C) combined, and the amount of radical (D) is in the range of 20 to 50 mole percent, based on the total moles of radical (A) and (D) combined.

* * * * *